United States Patent
Kobata

(10) Patent No.: US 12,304,073 B2
(45) Date of Patent: May 20, 2025

(54) MACHINE LEARNING DEVICE, MACHINE LEARNING METHOD, AND CONTROLLER FOR ROBOT

(71) Applicant: DENSO WAVE INCORPORATED, Aichi-pref. (JP)

(72) Inventor: Shohei Kobata, Chita-gun (JP)

(73) Assignee: DENSO WAVE INCORPORATED, Aichi (JP)

(*) Notice: Subject to any disclaimer, the term of this patent is extended or adjusted under 35 U.S.C. 154(b) by 175 days.

(21) Appl. No.: 17/714,567

(22) Filed: Apr. 6, 2022

(65) Prior Publication Data

US 2022/0314436 A1   Oct. 6, 2022

(30) Foreign Application Priority Data

Apr. 6, 2021   (JP) .................. 2021-064749

(51) Int. Cl.
  *B25J 9/16*   (2006.01)
  *G05B 13/02*   (2006.01)

(52) U.S. Cl.
  CPC ............. *B25J 9/163* (2013.01); *B25J 9/1612* (2013.01); *B25J 9/1679* (2013.01); *G05B 13/0265* (2013.01); *B25J 9/1687* (2013.01); *G05B 2219/40082* (2013.01); *G05B 2219/45097* (2013.01)

(58) Field of Classification Search
  CPC ........ B25J 9/163; B25J 9/1612; B25J 9/1679; B25J 9/1687; B25J 9/1697; G05B 13/0265; G05B 2219/40082; G05B 2219/45097; G05B 2219/40032; G05B 2219/39305; G05B 2219/40609
  See application file for complete search history.

(56) References Cited

U.S. PATENT DOCUMENTS

| | | | |
|---|---|---|---|
| 11,685,045 B1 * | 6/2023 | Herzog | B25J 9/161 700/250 |
| 11,820,014 B2 * | 11/2023 | Kolluri | B25J 9/1617 |
| 12,042,945 B2 * | 7/2024 | Stramandinoli | B25J 9/163 |
| 2017/0028562 A1 * | 2/2017 | Yamazaki | B25J 9/163 |
| 2019/0152054 A1 * | 5/2019 | Ishikawa | B25J 9/163 |
| 2019/0224844 A1 * | 7/2019 | Tsuda | G06N 3/088 |
| 2020/0276715 A1 * | 9/2020 | Masukawa | B25J 9/0087 |
| 2020/0326718 A1 * | 10/2020 | Kandemir | G05D 1/0088 |
| 2020/0352037 A1 * | 11/2020 | Kobori | B25J 9/0084 |
| 2020/0353620 A1 * | 11/2020 | Hasunuma | B25J 19/023 |
| 2021/0181728 A1 * | 6/2021 | Yamaguchi | B25J 9/1697 |
| 2022/0347853 A1 * | 11/2022 | Claussen | G06F 30/10 |

FOREIGN PATENT DOCUMENTS

JP   2020-095969 A   6/2020

* cited by examiner

*Primary Examiner* — Sohana Tanju Khayer
(74) *Attorney, Agent, or Firm* — Oliff PLC

(57) ABSTRACT

A machine learning device and a machine learning method are provided. A controller, which serves as the machine learning device and the machine learning method, is provided to perform machine learning of algorithms for arranging a flexible wire-like workpiece to a predetermined state using an industrial robot. In an embodiment, the machine learning device includes: an acquisition unit that acquires, as state variables, a state of the workpiece before arrangement starts and a state of the workpiece during arrangement; and a learning unit that performs machine learning of an algorithm for arranging the workpiece based on the state variables acquired by the acquisition unit.

5 Claims, 9 Drawing Sheets

OPEN STATE: PLAN VIEW

GRIPPING STATE: PLAN VIEW

GRIPPING STATE: SIDE VIEW

TRAINING DATA EXAMPLE: DURING GRIPPING (PLAN VIEW)

TRAINING DATA EXAMPLE: DURING GRIPPING (SIDE VIEW)

MACHINE LEARNING DEVICE, MACHINE LEARNING METHOD, AND CONTROLLER FOR ROBOT

CROSS-REFERENCE TO RELATED APPLICATION

This application is based on and claims the benefit of priority from earlier Japanese Patent Application No. 2021-064749 filed Apr. 6, 2021, the description of which is incorporated herein by reference.

BACKGROUND

Technical Field

The present invention relates to a machine learning device, a machine learning method and a controller for a robot for performing machine learning of algorithms for arranging a flexible wire-like workpiece to a predetermined state using a robot, especially, an industrial robot.

Background Art

Assembly of wire harnesses has been automated with an industrial robot. For example, in JP 2020-95969 A, a connector is devised so that wire harness assembly can be performed by a robot.

PATENT REFERENCE

[patent reference 1] JP 2020-95969 A

Technical Problem

However, automation using an industrial robot may cause a problem. That is, in arrangement of flexible wire-like workpieces to a predetermined state, the overall shapes of the workpieces are expected to be different from each other. For example, the position to be gripped by the robot may be different depending on the placement state of each workpiece, or the orientation of the workpiece may be different depending on the twist of each workpiece.

When the overall shapes of the workpieces are different from each other, the orientation of and the force applied to the workpieces in transport of the workpieces for arrangement may differ for each workpiece, that is, cannot be covered by a pre-programmed operation. Accordingly, it is not realistic to program or teach in advance an operation that can correspond to all the expected shapes.

SUMMARY

It is thus desired to provide a machine learning device, a machine learning method and a controller for a robot for performing machine learning of algorithms for arranging a flexible wire-like workpiece to a predetermined state using an industrial robot.

Solution to Problem

According to a first exemplary embodiment, a machine learning device that performs machine learning of an algorithm for arranging a flexible wire-like workpiece to a predetermined state using an industrial robot (hereinafter, simply a robot), the machine learning device includes: an acquisition unit that acquires, as state variables, a state of the workpiece before arrangement starts and a state of the workpiece during arrangement; and a learning unit that performs machine learning of an algorithm for arranging the workpiece based on the state variables acquired by the acquisition unit.

Accordingly, the machine learning device can perform machine learning of an algorithm for arranging the flexible wire-like workpiece to a predetermined state using a robot even when the overall shapes of the workpieces, that is, the placement states of the workpieces are different from each other, or even when all the expected patterns are not programmed or taught in advance in arrangement of the flexible wire-like workpiece to a predetermined state.

According to a second exemplary embodiment, the machine learning device further includes a storage unit that pre-stores a plurality of training data for arranging the workpiece to a predetermined state, wherein the learning unit classifies the state variables while referring the training data stored in the storage unit to thereby perform machine learning of an algorithm. That is, the machine learning device performs machine learning of the algorithm capable of actually correctly arranging the workpiece based on the training data prepared in advance for correct arrangement of the workpiece. Accordingly, the robot can be operated in a state where conditions which make arrangement difficult are eliminated, and the workpiece can be correctly arranged.

According to a third exemplary embodiment, the machine learning device performs machine learning of an algorithm recursively based on the state variables acquired when the robot is operated. Accordingly, machine learning of an algorithm can be performed while reducing the burden on the user. In addition, state variables are also acquired for machine learning when the workpiece is actually arranged so that machine learning of correct operation can be further performed.

According to a fourth exemplary embodiment, the machine learning device further includes a storage unit that pre-stores a plurality of training data for arranging the workpiece to a predetermined state, wherein the learning unit classifies the state variables while referring the training data stored in the storage unit to thereby perform machine learning of an algorithm. That is, the machine learning device performs machine learning of the algorithm capable of actually correctly arranging the workpiece based on the training data prepared in advance for correct arrangement of the workpiece.

The above machine learning device at least acquires, as state variables, a position of the workpiece, a force applied from the workpiece when the workpiece is gripped, and a posture of the robot. By acquiring these data as state variables, it is possible to acquire conditions to be satisfied from gripping the workpiece to arranging it to a predetermined state, in other words, the conditions required for correct arrangement. The machine learning of the algorithm based on these conditions makes it possible to cause the robot to perform an appropriate operation.

According to a fifth exemplary embodiment, machine learning is performed by a method performed by the machine learning device described above. Accordingly, machine learning of an algorithm for arranging the flexible wire-like workpiece to a predetermined state using a robot can be performed even when the overall shapes of the workpieces, that is, the placement states of the workpieces are different from each other, or even when all the expected patterns are not programmed or taught in advance in arrangement of the flexible wire-like workpiece to a predetermined state.

According to a sixth exemplary embodiment, a controller for a robot, the controller includes a control unit that controls an operation of the robot based on an algorithm learned by the machine learning device described above. Accordingly, the flexible wire-like workpiece can be arranged to a predetermined state using a robot even when the overall shapes of the workpieces, that is, the placement states of the workpieces are different from each other, or even when all the expected patterns are not programmed or taught in advance in arrangement of the flexible wire-like workpiece to a predetermined state.

DESCRIPTION OF THE PREFERRED EMBODIMENTS

Figure 1:
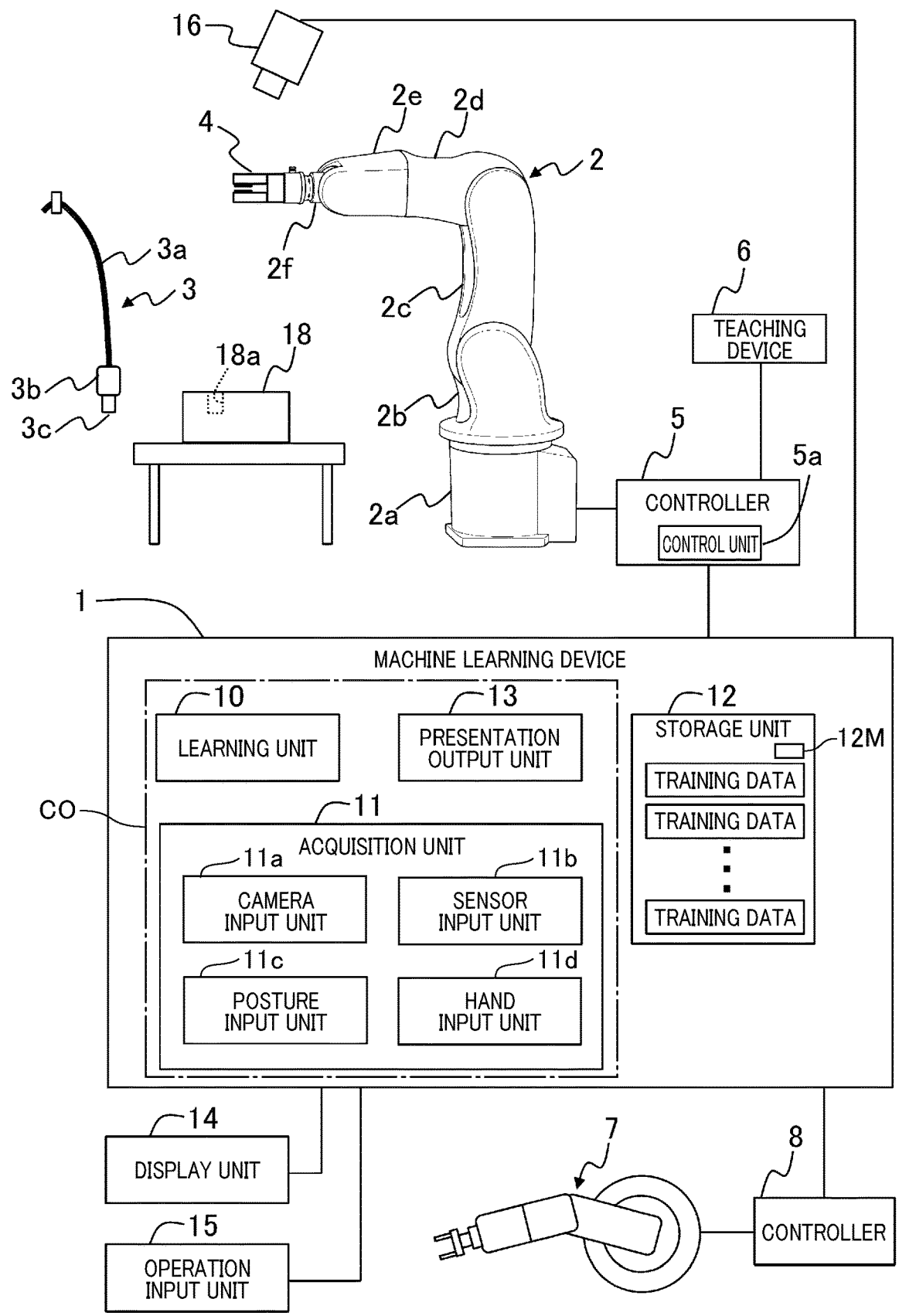
FIG. 1 is a diagram schematically illustrating a configuration example of a machine learning device according to a first embodiment.

With reference to the drawings, a plurality of embodiments will be described below. Components substantially common to the respective embodiments are denoted by the same reference numerals.

First Embodiment

A first embodiment will be described below. As shown in FIG. 1, a machine learning device 1 of the present embodiment performs machine learning of algorithms for arranging a flexible wire-like workpiece 3 (such a wire harness) to a predetermined state using an industrial robot 2 (simply, a robot). In the following description, directions horizontal to an installation surface of the robot 2 and perpendicular to each other are referred to as an X direction and a Y direction, and a direction vertical to both the X direction and the Y direction is referred to a Z direction. A plane horizontal to the installation surface is referred to as an XY plane. Further, a view as viewed in the Z direction is referred to as a plane view, and a view as viewed in a direction horizontal to the XY plane is referred to as a side view.

In the embodiment, the term of "flexible wire-like (wire-shaped or wire-formed piece", which is typically shown by a wire harness, means objects which can be bent due to an external force including a force due to self-weight thereof.

The robot 2 includes a base 2a installed on the installation surface, a shoulder 2b rotatable relative to the base 2a, a lower arm 2c rotatable relative to the shoulder 2b, a first upper arm 2d rotatable relative to the lower arm 2c, a second upper arm 2e coaxially rotatable relative to the first upper arm 2d, and a flange 2f provided on a distal end of the second upper arm 2e. That is, the present embodiment uses a vertical articulated 6-axis robot. It should be noted, however, that a 7-axis robot or a horizontal articulated 4-axis robot may also be used.

Figure 2:
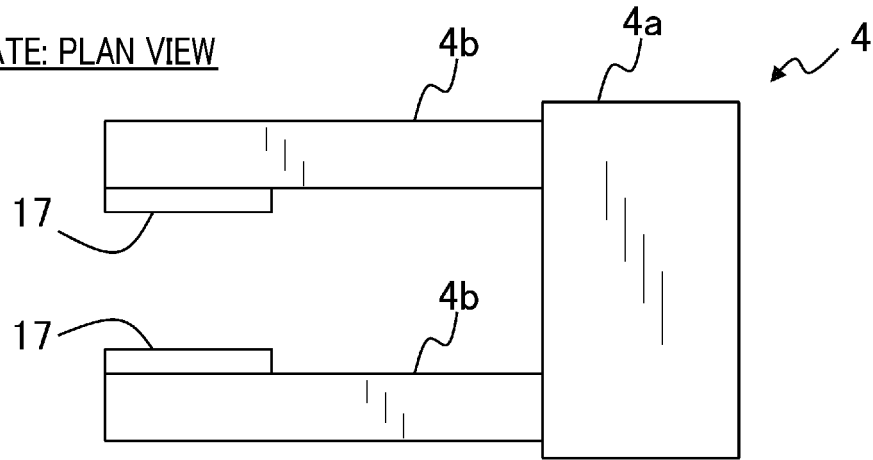
FIG. 2 is a diagram schematically illustrating a configuration of a hand and a contact sensor.
Figure 2:
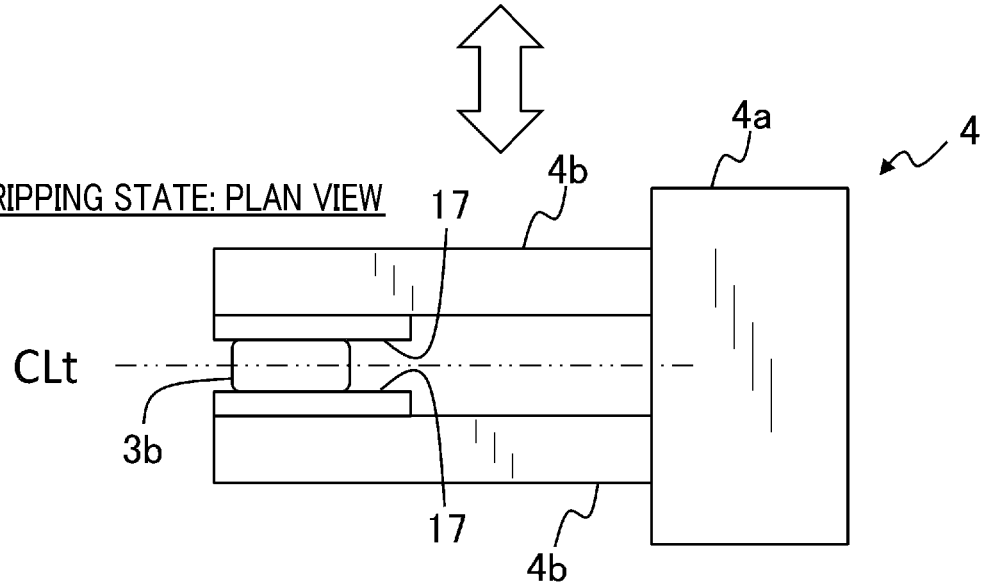
Figure 2:
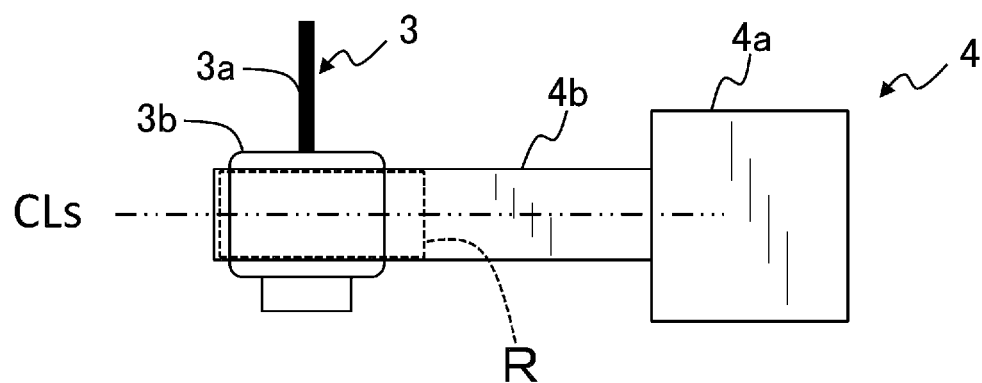

A hand 4 is mounted on a distal end of the flange 2f. As shown in FIG. 2, the hand 4 includes a stationary unit 4a mounted on the flange 2f, and two movable units 4b provided movable relative to the stationary unit 4a. In a gripping state of the hand 4, the movable units 4b move toward each other to grip a workpiece. For example, the hand 4 can grip a rigid connector 3b of the workpiece 3 having a flexible cable 3a and the connector 3b provided at an end of the cable 3a. In FIG. 2, a virtual center of the hand 4 in a plan view is indicated as a virtual line (CLt), and a virtual center of the hand 4 in a side view is indicated as a virtual line (CLs).

The robot 2 is connected to a controller 5 having a control unit 5a that controls a posture of the robot 2. The posture of the robot 2 changes as a motor (not shown) provided on each shaft of the robot 2 is driven according to a control command output from the control unit 5a. The controller 5 also outputs a control command for controlling the open/close state of the hand 4. Further, the controller 5 is configured to output the posture of the robot 2 and the open/close state of the hand 4 to the machine learning device 1. A teaching device 6 is further connected to the controller 5 to teach an operation to the robot 2.

The machine learning device 1 is communicably connected to the controller 5, and can control the robot 2 by instructing an operation of the robot 2 to the controller 5. As described above, the posture of the robot 2 and the open/close state of the hand 4 can be acquired from the controller 5. In the present embodiment, the machine learning device 1 is connected to a small robot 7 and its controller 8 so that the robot 2 can be operated following the operation of the small robot 7. That is, the small robot 7 can be used as an input device for operating the robot 2, instead of or in combination with the teaching device 6. Thus, a machine learning system including these components can be constructed.

The machine learning device 1 includes a learning unit 10, an acquisition unit 11, a storage unit 12, a presentation output unit 13, and the like. Further, the machine learning device 1 is connected to a display unit 14 such as a display used in modification of the algorithm as described later, and an operation input unit 15 such as a keyboard or a mouse used to input an operation for modifying the algorithm.

In the device 1 according to the present embodiment, the learning unit 10, the acquisition unit 11, and the presentation output unit 13 can be configured by a computer system CO provided with a CPU (central processing unit) or processor and memories including the storage unit 12. The CPU or processor is enabled to read necessary program from the memories and execute the steps described in the programs, resulting in that the computer system CO functionally provides the foregoing units 10, 11 and 13. By way of example, the storage 12 is allowed to have a memory for storing such pogroms therein.

Although the details will be described later, the learning unit 10 performs machine learning of an algorithm for arranging the workpiece 3 based on the state variables acquired by the acquisition unit 11. The learning unit 10 classifies the state variables while referring the training data, which are stored in the storage unit 12 in the present embodiment, to thereby perform machine learning of an algorithm.

The acquisition unit 11 includes a camera input unit 11a, a sensor input unit 11b, a posture input unit 11c and a hand input unit 11d, and acquires, as state variables, a state of the workpiece 3 before arrangement starts and a state of the workpiece 3 during arrangement.

In the present embodiment, the term of "a state of the workpiece 3 before arrangement starts" shows a state where the hand 4 grips the connector 3b of the workpiece 3, but transport of the workpiece 3 is not started yet. In addition, the term of "a state of the workpiece 3 during arrangement" shows a state where the hand 4 which has gripped the connector 3b of the workpiece 3 is transported to an attachment position and attached thereat (for example, insertion of a connector terminal into an insertion hole, as will be exemplified later).

The camera input unit 11a is connected to a camera 16 that images the workpiece 3 and a work area during arrangement of the workpiece 3, and receives an image or a video captured by the camera 16. Thus, the machine learning device 1 can acquire the orientation and the position of the workpiece 3 as state variables indicating the state of the workpiece 3 before arrangement starts and the state of the workpiece 3 during arrangement.

The sensor input unit 11b receives the detection value from a contact sensor 17 mounted on the hand 4 of the robot 2 as shown in FIG. 2. The contact sensor 17 has a flat surface, on which a plurality of detection positions are provided. Accordingly, a substantially entire surface of the contact sensor 17 provides a detection range (R). When the workpiece 3 is gripped, the position of the workpiece 3 in the detection range (R), that is, the position of the workpiece 3 in the control coordinates of the robot 2 can be detected. Further, since the contact sensor 17 has the plurality of detection positions, it can detect not only the force for gripping the workpiece 3 but also the direction of the force applied during transport of the workpiece 3, for example.

The posture input unit 11c receives data on the current posture of the robot 2 acquired from the controller 5. The hand input unit 11d receives the open/close state of the hand 4. The open/close state includes a distance between the movable units 4b of the hand 4.

Thus, based on the input to the posture input unit 11c, the input to the sensor input unit 11b and the input to the hand input unit 11d, the machine learning device 1 can acquire, as state variables indicating the state of the workpiece 3 before and during arrangement, the data indicating the posture and force of the robot 2 gripping the workpiece 3 and the force applied to the workpiece 3 during operation of the robot 2.

The storage unit 12 stores a plurality of training data for arranging the workpiece 3 to a predetermined state, as illustrated in FIG. 1. The training data indicates a correct operation for arranging the workpiece 3 to a predetermined position. In the present embodiment, the training data are stored as a group of state variables acquired when the robot 2 is operated by manual operation to correctly arrange the workpiece 3 from a certain position or orientation.

Although not shown, the storage unit 12 incudes a memory 12M in which various computer-readable programs for the machine learning used in the present embodiment is stored in advance. Hence, such a memory serves as a non-transitory computer readable recording medium.

That is, the machine learning device 1 of the present embodiment performs machine learning of an algorithm for arranging the flexible wire-like workpiece 3 by a supervised learning method, in which the training data for correctly arranging the workpiece 3 is memorized in advance.

The presentation output unit 13 displays the learned algorithm on, for example, the display unit 14 to present it to the user. Accordingly, the user can appropriately modify the presented algorithm to, for example, the state variables acquired during operation or the state of the workpiece 3 after arrangement. Further, the presentation output unit 13 can output the learned algorithm or the presented algorithm to the controller 5. Then, the controller 5 outputs, from the control unit 5a to the robot 2, a control command based on the algorithm that has been output so that the controller 5 can control the operation of the robot 2 based on the algorithm learned by the machine learning device 1.

Next, effects of the above configuration will be described.

As described above, in arrangement of the flexible wire-like workpieces 3 to a predetermined state using the robot 2, the overall shapes of the workpieces 3, that is, the placement states of the workpieces 3 before the robot 2 is operated are expected to be different from each other. In this case, the position to be gripped by the robot 2 may differ for each workpiece 3, or the workpiece 3 may be twisted in such an orientation that the robot 2 cannot grip the workpiece 3.

When the overall shapes of the workpieces 3 are different from each other, the orientation of and the force applied to the workpieces 3 in transport of the workpieces 3 for arrangement may differ for each workpiece 3, that is, cannot be covered by a pre-programmed operation. Accordingly, it is not realistic to program or teach in advance an operation that can correspond to all the expected shapes. Therefore, the machine learning device 1 performs machine learning of an algorithm for arranging the flexible wire-like workpiece 3 to a predetermined state by executing the procedures shown in FIGS. 3 and 5.

Figure 3:
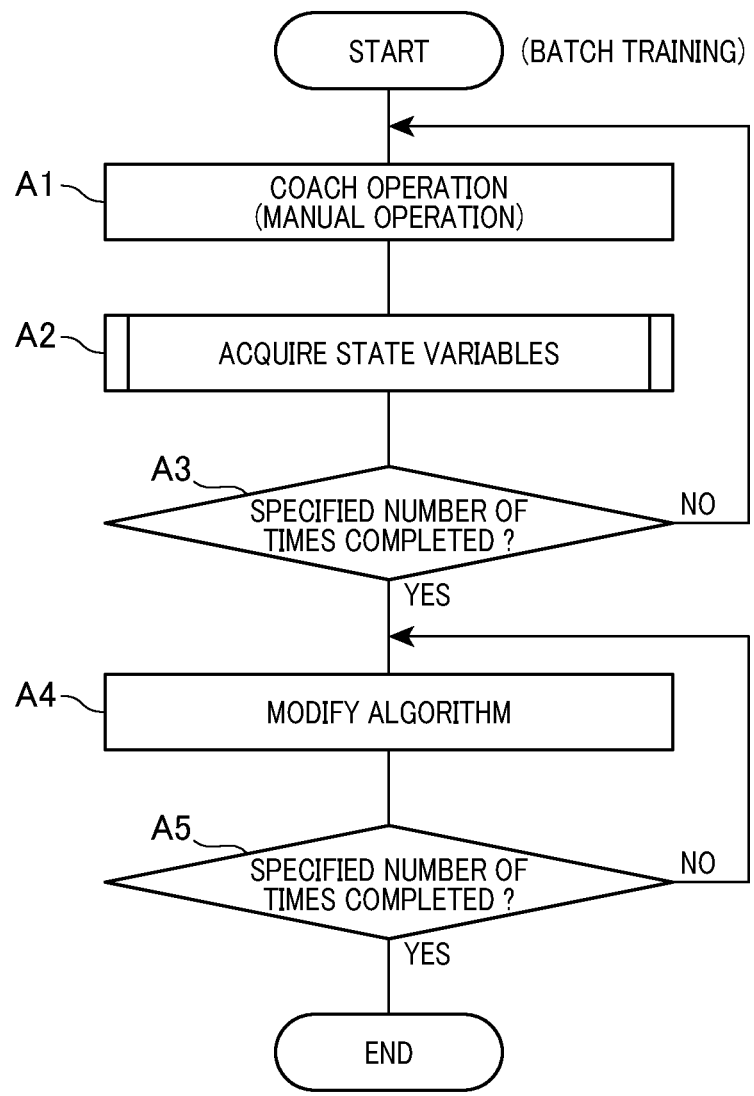
FIG. 3 is a flowchart of a machine learning procedure.

The machine learning device 1 coaches an operation of the robot 2 (step A1) as a batch training as shown in FIG. 3. In the present embodiment, coaching of the operation is performed by manual operation in which the user manually operates the robot 2. Specifically, as the user changes the posture of the small robot 7, the data indicating the change in posture is input to the machine learning device 1, and the machine learning device 1 outputs an instruction for operating the controller 5 based on the received data. Then, the controller 5 outputs a control instruction to the robot 2 based on the received instruction so that the robot 2 follows the change in posture of the small robot 7.

Figure 4:
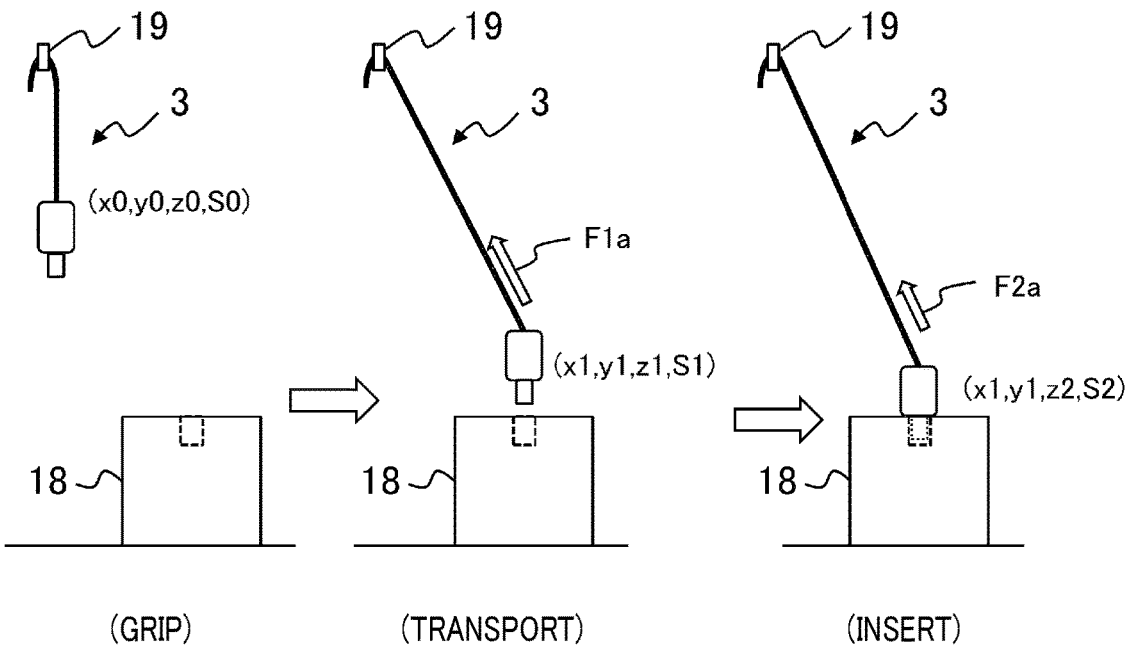
FIG. 4 is a diagram schematically illustrating examples of arrangement pattern of a workpiece.
Figure 4:
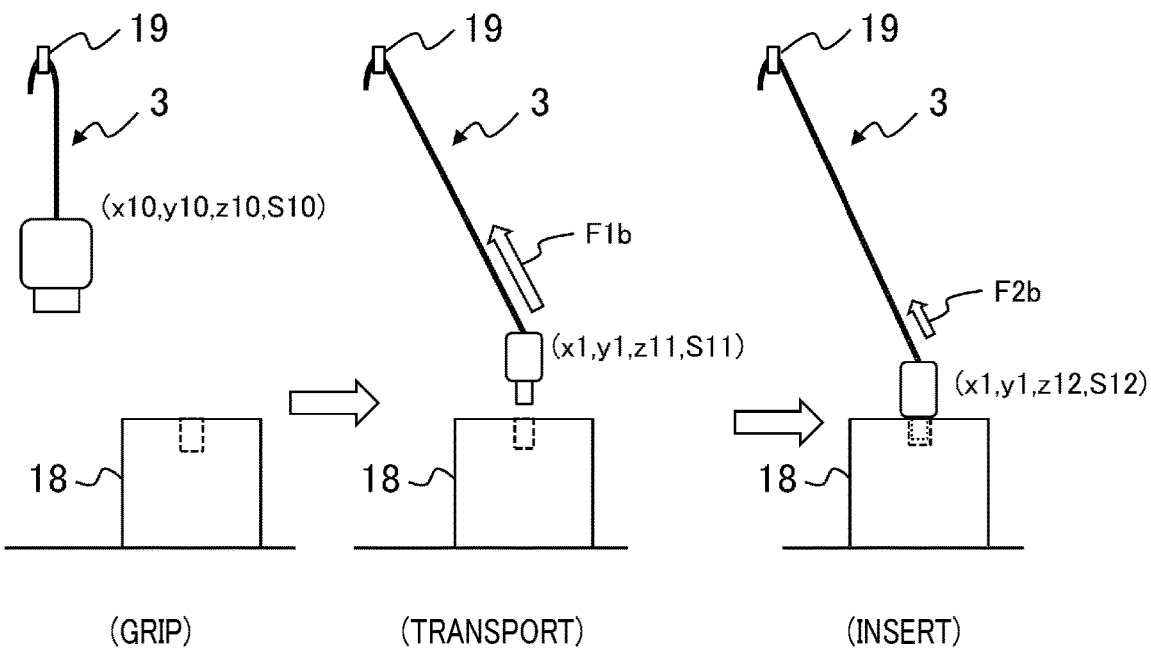

For example, an arrangement pattern 1 is shown in FIG. 4. In this pattern, an operation for inserting the connector 3b of the workpiece 3 into an insertion hole 18a of the object 18 is assumed. The workpiece 3 is placed with the cable 3a being suspended from a hook 19. A series of operations are coached as follows. As an operation condition, the connector 3b is gripped and transported to a target position above the insertion hole 18a. Then, a rigid terminal 3c protruding from the connector 3b is inserted into the insertion hole 18a.

Figure 5:
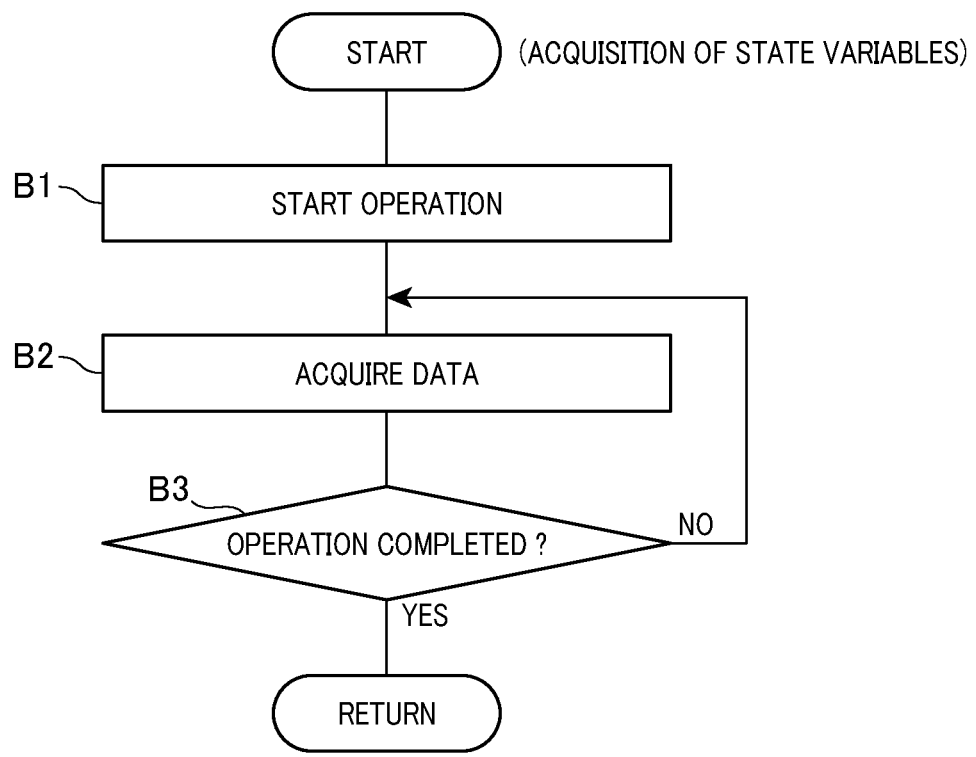
FIG. 5 is a flowchart of a procedure for acquiring state variables.

As the coaching starts, the machine learning device 1 acquires state variables (A2). In this step, acquisition of state variables is performed as shown in FIG. 5. As the robot 2 starts operation (step B1), the machine learning device 1 acquires various types of data (B2). The data acquired in this step correspond to the state variables, which include an image captured by, for example, the camera 16 as shown in FIG. 4, coordinates indicating the grip position at which the workpiece 3 is gripped, a posture of the robot 2 gripping the workpiece 3, a gripping force with which the workpiece 3 is gripped, and the like. In FIG. 4, the position of the workpiece 3, that is, the coordinates of the position of the hand 4 in the X direction (x0), the Y direction (y0) and the Z direction (z0), and the posture of the robot 2 (S0) are shown as (x0, y0, z0, S0).

The machine learning device 1 repeats acquisition of data until the operation is completed (B3: NO). In transport of the workpiece 3 from a grip position to a target position, the machine learning device 1 acquires the image of the workpiece 3, the positional trajectory of the hand 4, the magnitude and direction of the force (F1a) detected by the contact sensor 17, the gripping force, the posture of the robot 2, and the like. Further, in insertion of the connector 3b, the machine learning device 1 acquires the image of the workpiece 3, the position of the hand 4, the magnitude and direction of the force (F2a) detected by the contact sensor 17, the gripping force, and the posture of the robot 2 both during insertion and when the insertion is completed. When the operation is completed (B2: YES), the machine learning device 1 returns.

As described above, the present embodiment uses a supervised method in which machine learning is performed by memorizing correct operation. In this case, it is necessary to memorize a plurality of patterns of correct operation. Therefore, the machine learning device 1 determines whether a specified number of times of coaching has been completed (A3). If the specified number of times of coaching has not been completed (A3: NO), the process proceeds to step A1 to perform coaching of another pattern having different arrangement.

As another pattern, an arrangement pattern 2 is shown in FIG. 4. In this pattern, the orientation of the connector 3b may be different or the length to the hook 19 may be different due to the twist of the workpiece 3. Although FIG. 4 illustrates two patterns of arrangement, the actual coaching is performed for more patterns, for example, 50 patterns of arrangement.

In this pattern as well, state variables such as the image of the workpiece 3, the position of the hand 4, the posture of the robot 2, the positional change or the force (F1b) and the posture during gripping and transport, and the positional change or the force (F2b) during insertion are acquired.

If the specified number of times of coaching has been completed (A3: YES), the machine learning device 1 modifies the algorithm (A4). This algorithm shows the operation of the robot 2 for appropriately arranging the workpiece 3. The machine learning device 1 modifies the algorithm in each pattern of arrangement based on the state variables acquired in the coaching.

This modification is performed for improving the cycle time by modifying the direction to which the robot 2 changes its posture. Alternatively, the algorithm may be presented to the user so that the user can modify the algorithm. There may also a case where the algorithm does not need to be modified.

The machine learning device 1 determines whether a specified number of times of modification has been completed (A5). If the specified number of times of modification has not been completed (A5: NO), the process proceeds to step A4 to modify the algorithm in another pattern. If the specified number of times of modification has been completed (A5: YES), the process ends.

Figure 6:
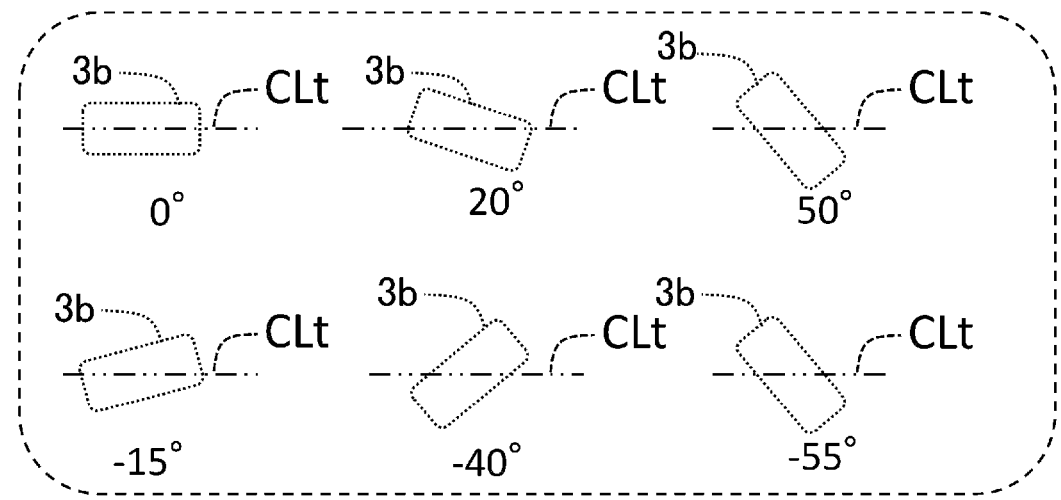
FIG. 6 is a diagram schematically illustrating a first example of training data.
Figure 6:
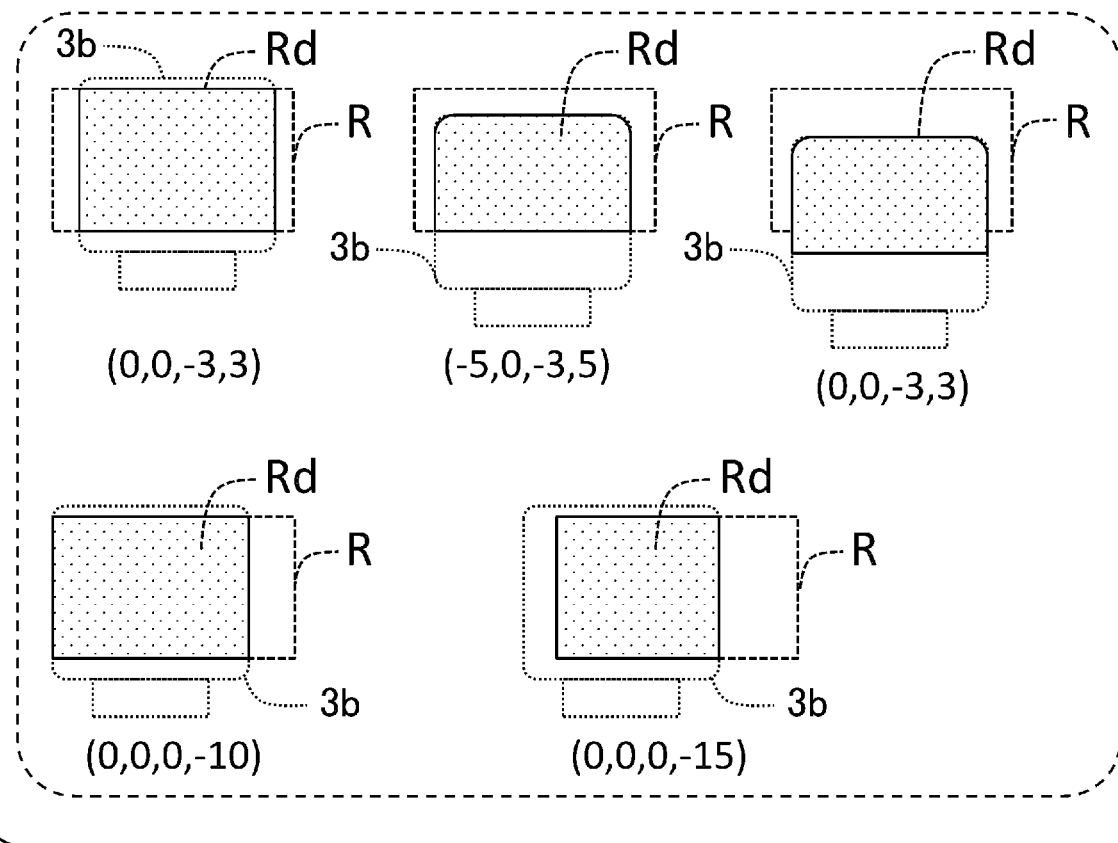

As a result, as shown in FIG. 6 and the like, the data indicating the operation in which the workpiece 3 is correctly arranged, that is, the training data for machine learning are collected. In FIG. 6, a model is schematically illustrated to make visual understanding easier. However, the actual training data is composed of numerical data, image data, and the like.

For example, as shown in FIG. 6, the training data during gripping may be, for example, a set of orientations of the connector 3b relative to the virtual line (CLt) in a plan view. The training data indicate that correct arrangement is performed as described above with the angle of the longitudinal direction of the connector 3b relative to the virtual line (CLt) within the range of, for example, −55° to 50°. Therefore, for example, when the orientation of the connector 3b acquired during work is 30°, the machine learning device 1 can perform machine learning for correct gripping by classifying the value, even when there is no data matching the training data. That is, the grip conditions for gripping the workpiece 3 can be acquired.

Further, the training data may be a set of positions of the connector 3b in side view during gripping. For example, a range in which a force is detected when the connector 3b is gripped in the detection range (R) is referred to as a detection range (Rd). In FIG. 6, a distance L1 between the upper ends of Rd and R, a distance L2 between the lower ends of Rd and R, a distance L3 between the left ends of Rd and R, and a distance L4 between the right ends of Rd and R are shown as (L1, L2, L3, L4). Therefore, by classifying the position of the gripped connector 3b, the machine learning device 1 can perform machine learning for correct gripping even when there is no data matching the training data. That is, the grip conditions for gripping the workpiece 3 can be acquired.

Figure 7:
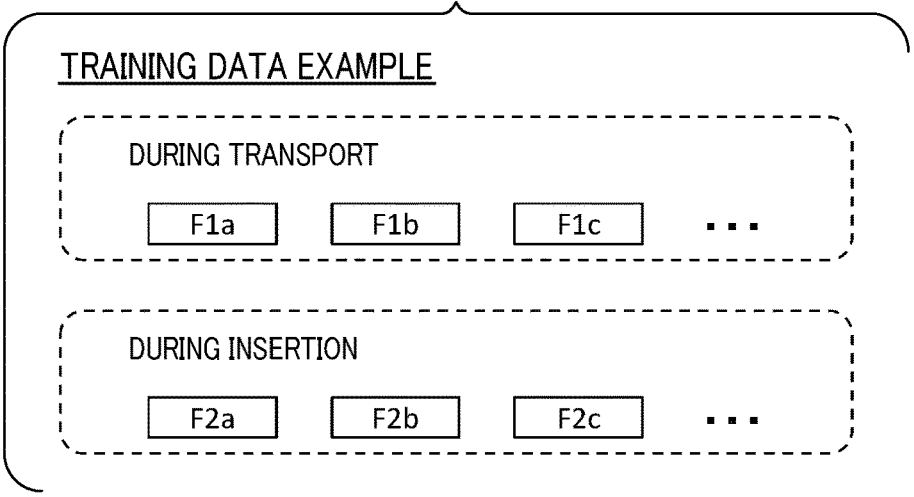
FIG. 7 is a diagram schematically illustrating a second example of training data.

In addition, as shown in FIG. 7, the training data may be a set of forces applied during transport or insertion. Accordingly, it is possible to perform machine learning of an allowable force during transport so that the workpiece 3 can be appropriately arranged while preventing the cable 3a from being damaged due to excessive tension. That is, the transport conditions for transporting the workpiece 3 and the insertion conditions for inserting the workpiece 3 can be acquired. It should be noted that the training data shown in FIGS. 6 and 7 are examples and are not limited thereto, and different training data can be used or combined with them.

According to the embodiment described above, the following advantageous effects can be obtained.

The machine learning device 1 performs machine learning of an algorithm for arranging the flexible wire-like workpiece 3 to a predetermined state using the robot 2, and includes the acquisition unit 11 that acquires, as state variables, a state of the workpiece 3 before the start of arrangement and a state of the workpiece 3 during arrangement, and the learning unit 10 that performs machine learning of the algorithm for arranging the workpiece 3 based on the state variables acquired by the acquisition unit 11.

Accordingly, the machine learning device 1 can perform machine learning of an algorithm for arranging the flexible wire-like workpiece 3 to a predetermined state using the robot 2 even when the overall shapes of the workpieces 3, that is, the placement states of the workpieces 3 are different from each other, or even when all the expected patterns are not programmed or taught in advance in arrangement of the flexible wire-like workpiece 3 to a predetermined state.

Further, the machine learning device 1 includes the storage unit 12 that pre-stores a plurality of training data for arranging the workpiece 3 to a predetermined state, and classifies the state variables while referring the training data stored in the storage unit 12 to thereby perform machine learning of an algorithm. That is, the machine learning device 1 performs machine learning of the algorithm capable of actually correctly arranging the workpiece 3 based on the training data prepared in advance for correct arrangement of the workpiece 3. Accordingly, since the robot 2 operates based on the data acquired by the appropriate operation, the workpiece 3 can be correctly arranged.

The machine learning device 1 at least acquires, as state variables, the position of the workpiece 3, the force applied from the workpiece 3 when the workpiece 3 is gripped, and the posture of the robot 2. By acquiring these data as state variables, it is possible to acquire conditions to be satisfied from gripping the workpiece 3 to arranging it to a predetermined state, in other words, the conditions required for correct arrangement. The machine learning of the algorithm based on these conditions makes it possible to cause the robot 2 to perform an appropriate operation.

Further, according to a machine learning method in which machine learning is performed by a method performed by the machine learning device 1 described above, the machine learning device 1 can perform machine learning of an algorithm for arranging the flexible wire-like workpiece 3 to a predetermined state using the robot 2 even when the overall shapes of the workpieces 3, that is, the placement states of the workpieces 3 are different from each other, or even when all the expected patterns are not programmed or taught in advance in arrangement of the flexible wire-like workpiece 3 to a predetermined state.

Further, the controller 5 of the robot 2 includes the control unit 5a that controls the operation of the robot 2 based on the algorithm learned by the machine learning device 1 described above. Accordingly, the flexible wire-like workpiece 3 can be arranged to a predetermined state using the robot 2 even when the overall shapes of the workpieces 3, that is, the placement states of the workpieces 3 are different from each other, or even when all the expected patterns are not programmed or taught in advance in arrangement of the flexible wire-like workpiece 3 to a predetermined state.

Further, in the present embodiment, coaching of the robot 2 is performed using the small robot 7. Accordingly, the robot 2 can be easily set to a desired posture, and can be easily set to perform a desired operation. When a plurality of patterns of coaching are performed, the work efficiency of coaching can be greatly improved due to the ease of operation of the robot 2.

Although the present embodiment shows an example in which a plurality of patterns of coaching are collectively performed and then each algorithm is modified, it is also possible to sequentially repeat acquisition of state variables and modification of the algorithm for each teaching.

Figure 8:
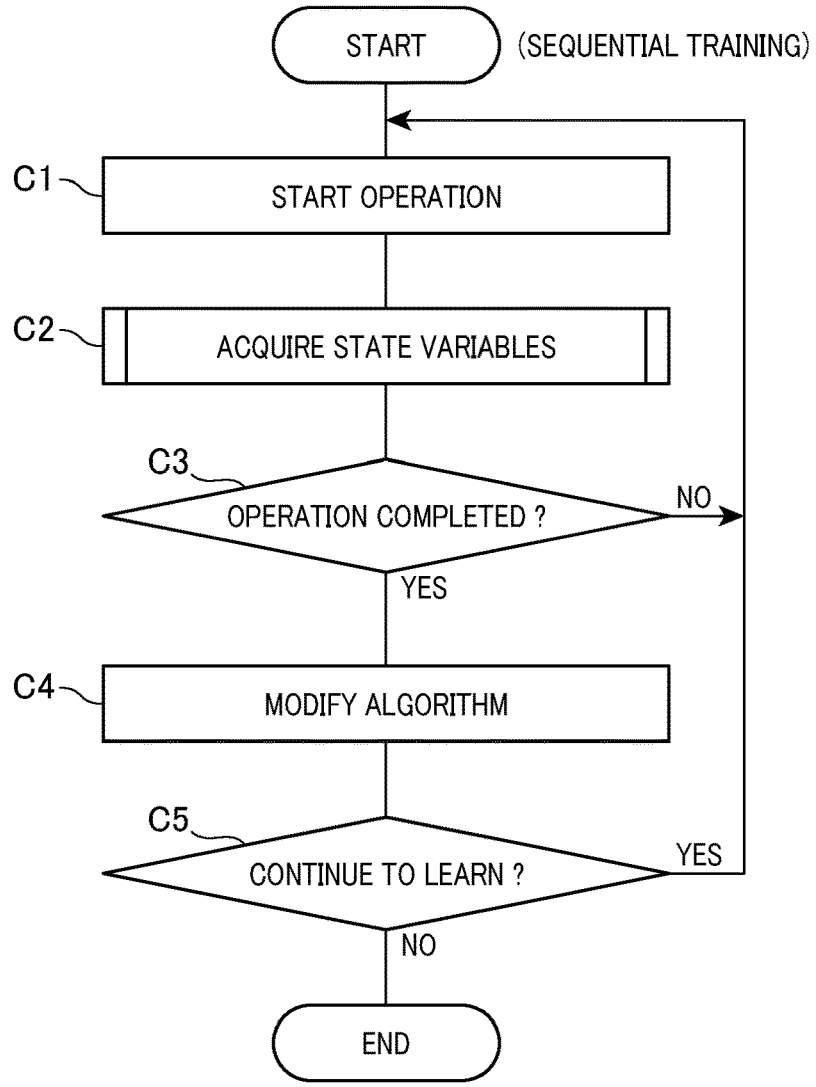
FIG. 8 is a flowchart of another machine learning procedure.

That is, in a flow of sequential training shown in FIG. 8, after starting the operation, for example, by manual operation (step C1), the machine learning device 1 acquires state variables (C2), continues acquisition of state variables until the operation is completed (C3: NO), and modifies the algorithm (C4) when the operation is completed (C3: YES). Then, if the machine learning device 1 continues machine learning (C5: YES), the process proceeds to step C1 to repeat the same procedure for the workpiece 3 in a different pattern. Thus, learning is repeated while collecting training data.

In this configuration as well, machine learning of an algorithm for arranging the flexible wire-like workpiece 3 to a predetermined state using the robot 2 can be performed even when the overall shapes of the workpieces 3, that is, the placement states of the workpieces 3 are different from each other, or even when all the expected patterns are not programmed or taught in advance in arrangement of the flexible wire-like workpiece 3 to a predetermined state. Thus, the same effect as with the embodiment can be achieved.

Further, state variables can also be acquired when the workpiece 3 is actually arranged, and the state variables in correct arrangement of the workpiece 3 can be accumulated as training data.

Second Embodiment

A second embodiment will be described below. The second embodiment differs from the first embodiment in that the machine learning device 1 performs machine learning of algorithms without given training data. The same components as those in the first embodiment are denoted by the same reference numerals.

Figure 9:
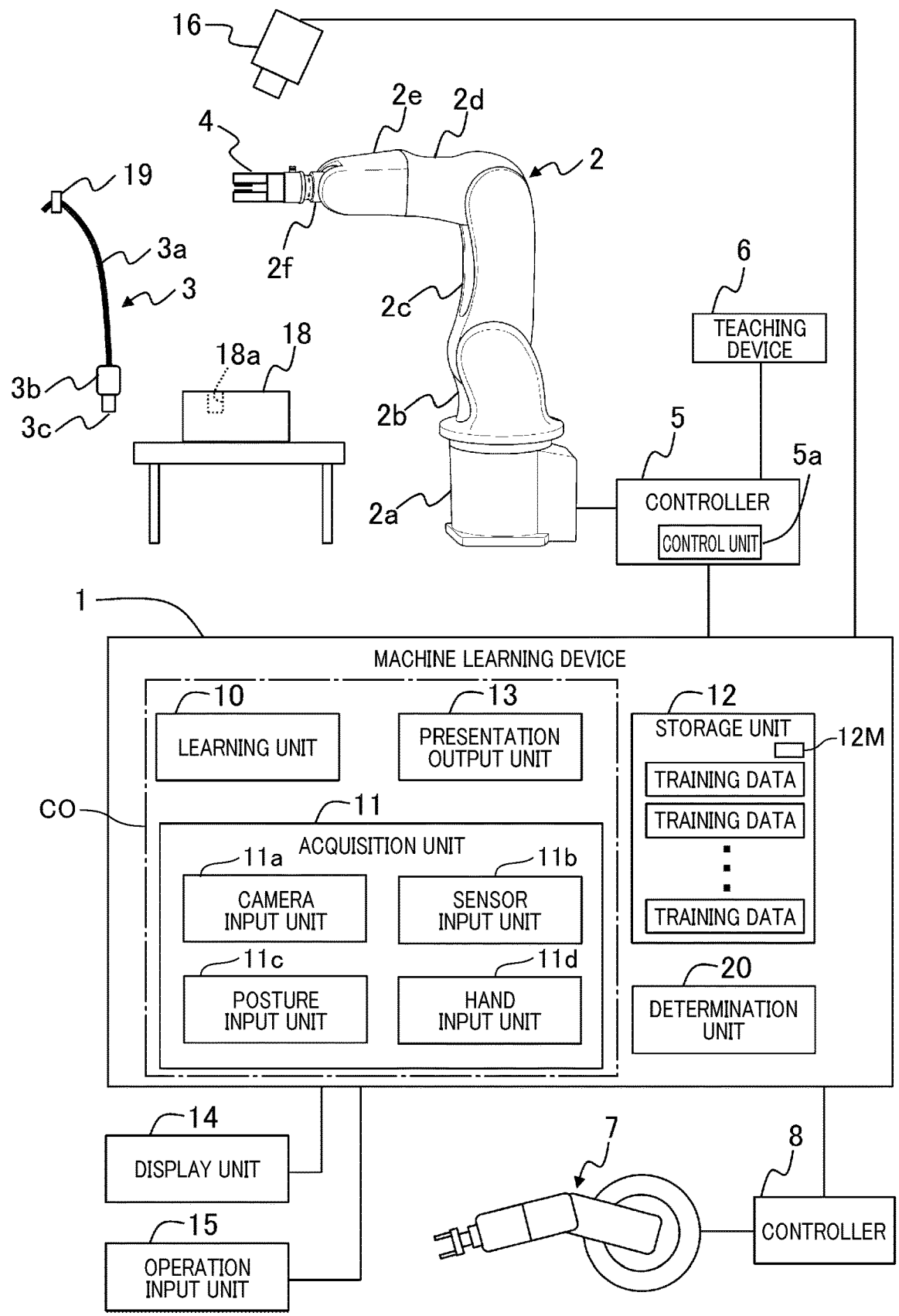
FIG. 9 is a diagram schematically illustrating a configuration example of a machine learning device according to a second embodiment.

As shown in FIG. 9, the machine learning device 1 of the second embodiment includes a determination unit 20. The determination unit 20 determines whether the workpiece 3 has been correctly arranged based on the acquired state variables. The learning unit 10 performs machine learning of an algorithm recursively based on the state variables acquired when the robot 2 is operated, more specifically, based on the determination result from the determination unit 20.

Figure 10:
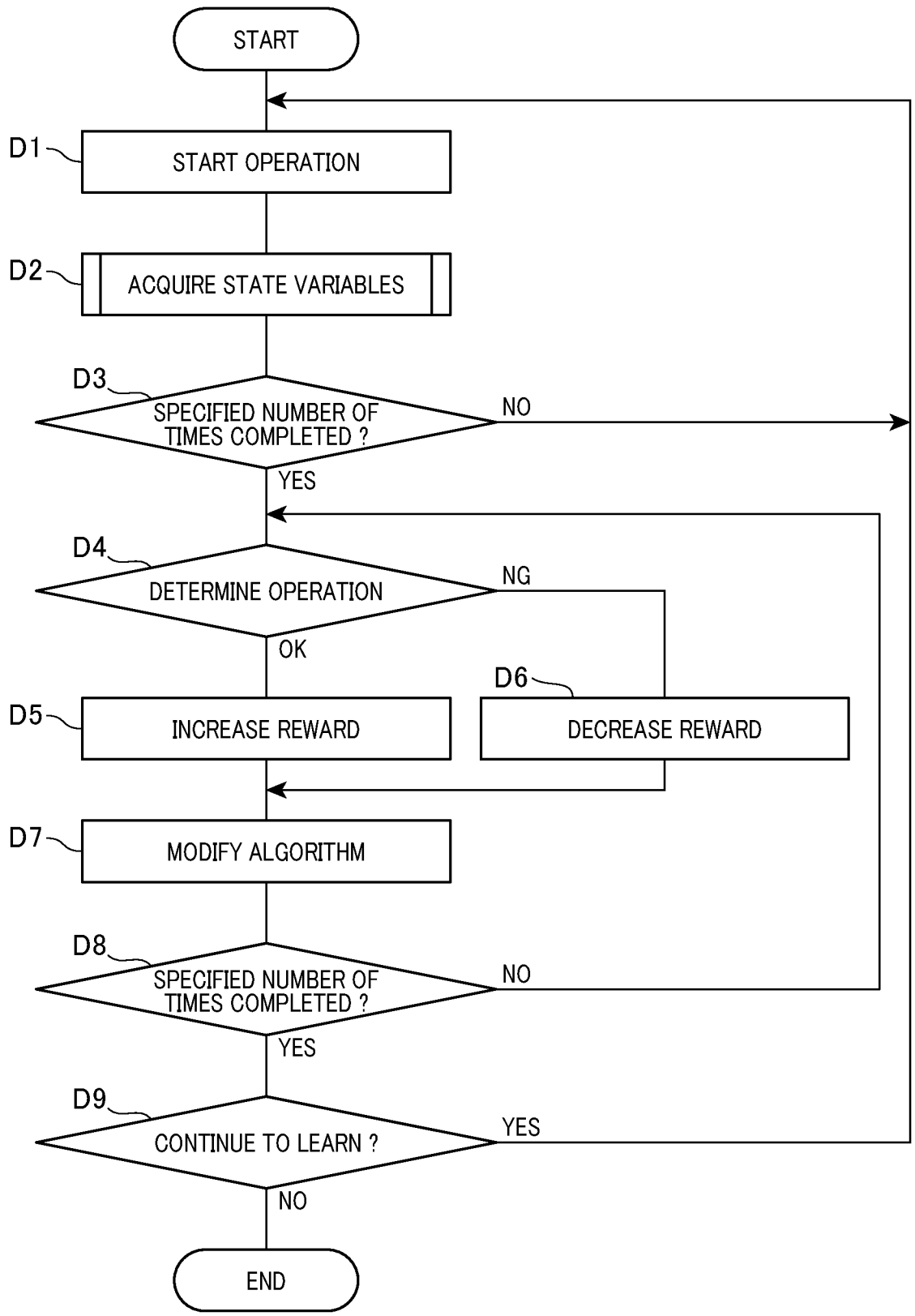
FIG. 10 is a flowchart of a machine learning procedure.

Specifically, as shown in FIG. 10, the machine learning device 1 starts operation (step D1). In this case, the machine learning device 1 operates the robot 2 to grip the connector 3b while referring an image captured by, for example, the camera 16, grips the workpiece 3, transports the workpiece 3 to a target position, and inserts the terminal 3c of the workpiece 3 into the insertion hole 18a. In this operation, a rough position may be taught in advance, and the position can be finely adjusted based on the image captured by the camera 16.

Then, the machine learning device 1 acquires state variables during operation (D2). The state variables are acquired in the same flow as that of FIG. 5 described in the first embodiment. Subsequently, the machine learning device 1 determines whether a specified number of times of operation has been completed (D3). If the specified number of times of operation has not been completed (D3: NO), the process proceeds to step D1 to start the next operation.

On the other hand, if the specified number of times of operation has been completed (D3: YES), the machine learning device 1 determines the operation (D4). In this step, the machine learning device 1 determines the operation, using the acquired state variables, based on whether the grip position of the workpiece 3 or the force applied during transport detected by, for example, the contact sensor 17 conforms the shape and strength of the workpiece 3 or the position and size of the insertion hole 18a and whether the cycle time until the arrangement work is completed satisfies the requirement.

If it is determined that the operation is correct (D4: OK), the machine learning device 1 increases a reward. On the other hand, if it is determined that the operation is not correct (D4: NG), the machine learning device 1 decreases a reward. This reward corresponds to an evaluation value of the operation. An operation with increased reward means that the operation is more appropriate, whereas an operation with decreased reward means that the operation is inappropriate.

The machine learning device 1 modifies the algorithm according to the necessity of each operation in view of the increase or decrease of the reward or in view of the acquired state variables. Alternatively, the algorithm may be presented to the user so that the user can modify the algorithm. There may also a case where the algorithm does not need to be modified.

When the specified number of times is completed, that is, when the verification of each operation is completed, the machine learning device 1 determines whether or not to continue learning (D9). In this case, the machine learning device 1 presents, for example, an inquiry to the user as to whether or not to continue the learning together with the learning result. When the user inputs an operation to continue the learning, the machine learning device 1 determines to continue the learning (D9: YES), and the process proceed to step D1 to start the next operation. On the other hand, when the user inputs an operation not to continue the learning because, for example, a sufficient learning result has been obtained, the machine learning device 1 determines not to continue the learning (D9: YES), and the process ends.

As described above, the machine learning device 1 of the present embodiment performs machine learning of an algorithm autonomously and recursively based on the state variables acquired when the robot 2 is operated. Accordingly, machine learning of an algorithm can be performed while reducing the burden on the user.

Accordingly, machine learning of an algorithm for arranging the flexible wire-like workpiece 3 to a predetermined state using the robot 2 can be performed even when the overall shapes of the workpieces 3, that is, the placement states of the workpieces 3 are different from each other, or even when all the expected patterns are not programmed or taught in advance in arrangement of the flexible wire-like workpiece 3 to a predetermined state. Thus, the same effect as with the first embodiment can be achieved.

Further, the machine learning device 1 also acquires state variables when the workpiece 3 is actually arranged and determines whether a correct operation has been performed. Thus, the machine learning device 1 is configured to perform machine learning during actual operation. Accordingly, machine learning of correct operation can be further performed.

The present invention is not limited to the embodiments described above or illustrated in the drawings, and can be modified, extended, or combined with components of the embodiments without departing from the gist thereof.

For example, the flexible wire-like workpiece according to the present disclosure is not limited to the wire harness and can be defined as a liner shape object that can be bent almost freely by an external force including its own weight. Hence it is estimated that the flexible wire-like workpiece according to the present disclosure still includes a power cable, an electric wire, a vinyl-made cord, or a rubber hose.

What is claimed is:

1. A machine learning device that performs machine learning of an algorithm for arranging a flexible wire-like workpiece to a predetermined state using a robot, the machine learning device comprising:
    an acquisition unit configured to acquire state variables showing a state of the workpiece before a start of arrangement of the workpiece which is to be performed by the robot, and acquire repeatedly the state variables during the arrangement of the workpiece which is performed by the robot to the predetermined state at which the workpiece is finally arranged, the workpiece having a connector, the state variables for each of the states including a position of the workpiece, a force applied from the workpiece when the connector of the workpiece is gripped, and a posture of the robot;
    a storage unit configured to pre-store a plurality of training data for arranging the workpiece to the predetermined state; and
    a learning unit configured to perform machine learning of the algorithm for arranging the workpiece based on the state variables acquired by the acquisition unit, by classifying values of the state variables acquired by the acquisition unit according to the training data pre-stored in the storage unit.

2. A machine learning method for performing machine learning of an algorithm for arranging a flexible wire-like workpiece to a predetermined state using a robot, the machine learning method comprising the steps of:
    acquiring state variables showing a state of the workpiece before a start of arrangement of the workpiece which is to be performed by the robot and acquiring repeatedly the state variables during the arrangement of the workpiece which is performed by the robot to the predetermined state at which the workpiece is finally arranged, the workpiece having a connector, the state variables for each of the states including a position of the workpiece, a force applied from the workpiece when the connector of the workpiece is gripped, and a posture of the robot; and
    performing machine learning of the algorithm for arranging the workpiece based on the state variables acquired by the acquiring step, by classifying values of the acquired state variables according to training data pre-stored in a storage unit.

3. A controller for a robot, the controller comprising:
    a control unit configured to control an operation of the robot based on an algorithm learned by a machine learning device, the machine learning device including:
    an acquisition unit configured to acquire state variables showing a state of a flexible wire-like workpiece provided before a start of arrangement of the workpiece which is to be performed by the robot, and acquire the state variables during the arrangement of the workpiece which is performed by the robot to a predetermined state at which the workpiece is finally arranged, the workpiece having a connector, the state variables for each of the states including a position of the workpiece, a force applied from the connector of the workpiece when the workpiece is gripped, and a posture of the robot;
    a storage unit configured to pre-store a plurality of training data for arranging the workpiece to the predetermined state; and
    a learning unit configured to perform machine learning of the algorithm for arranging the workpiece based on the state variables acquired by the acquisition unit, by classifying values of the state variables acquired by the acquisition unit according to the training data pre-stored in the storage unit.

4. The machine learning device according to claim 1, wherein the flexible wire-like workpiece is a wire harness, a power cable, an electric wire, a vinyl-made cord, or a rubber hose.

5. The machine learning method according to claim 2, wherein the flexible wire-like workpiece is a wire harness, a power cable, an electric wire, a vinyl-made cord, or a rubber hose.

* * * * *